US009790682B2

(12) United States Patent
O'Neill

(10) Patent No.: US 9,790,682 B2
(45) Date of Patent: Oct. 17, 2017

(54) PRE-FABRICATED CONSTRUCTION PANELS

(71) Applicant: REDCO NV, Kapelle-op-den-Bos (BE)

(72) Inventor: Bobby O'Neill, Glenmore (IE)

(73) Assignee: Etex Services NV, Kapelle-op-den-Bos (BE)

( * ) Notice: Subject to any disclaimer, the term of this patent is extended or adjusted under 35 U.S.C. 154(b) by 0 days.

(21) Appl. No.: 15/022,329

(22) PCT Filed: Sep. 8, 2014

(86) PCT No.: PCT/EP2014/069087
§ 371 (c)(1),
(2) Date: Mar. 16, 2016

(87) PCT Pub. No.: WO2015/039914
PCT Pub. Date: Mar. 26, 2015

(65) Prior Publication Data
US 2016/0230385 A1 Aug. 11, 2016

(30) Foreign Application Priority Data
Sep. 19, 2013 (EP) ..................................... 13185250

(51) Int. Cl.
E04B 1/70 (2006.01)
E04B 2/92 (2006.01)
(Continued)

(52) U.S. Cl.
CPC .................. *E04B 2/92* (2013.01); *B32B 3/30* (2013.01); *B32B 5/06* (2013.01); *B32B 5/145* (2013.01);
(Continued)

(58) Field of Classification Search
CPC . E04B 2/92; E04B 2/02; E04B 1/7076; E04B 1/7645; E04B 1/74; E04B 1/762;
(Continued)

(56) References Cited

U.S. PATENT DOCUMENTS 2,703,492 A * 3/1955 Brissette .................. G01N 3/14
73/818
3,187,902 A * 6/1965 Nelson ..................... B25H 3/04
211/70.6
(Continued)

FOREIGN PATENT DOCUMENTS

EP 2034522 A2 3/2009
WO 2013152048 A1 10/2013

*Primary Examiner* — Basil Katcheves
*Assistant Examiner* — Joshua Ihezie
(74) *Attorney, Agent, or Firm* — Dilworth & Barrese, LLP

(57) ABSTRACT

A pre-fabricated construction panel for use on an external surface and/or as part of a budding or construction is provided. The panel comprises at least a first layer which is at least partially provided from thermally insulating material having a first surface, the panel comprising at least a second layer, the at least second layer being provided from fiber cement board, the second layer having a second surface facing the first surface. The first surface is profiled having recessed surface zones and heightened surface zones, the first and second layers being connected one to the other at least along the heightened surface zones of the first, the recessed surface zones provides at least one interspace between the first and second surface. This at least one inter-space has at least two openings to the external of the panel for enabling air to flow into and out of the interspace towards the external of the panel. Less than 25% of the total surface of the first surface is connected to, e.g. adheres to, the second surface.

12 Claims, 2 Drawing Sheets

(51) Int. Cl.
| | |
|---|---|
| *B32B 5/06* | (2006.01) |
| *B32B 5/14* | (2006.01) |
| *B32B 5/24* | (2006.01) |
| *B32B 13/02* | (2006.01) |
| *B32B 13/04* | (2006.01) |
| *B32B 3/30* | (2006.01) |
| *E04F 13/00* | (2006.01) |
| *E04F 13/08* | (2006.01) |
| *E04B 1/74* | (2006.01) |
| *E04B 1/76* | (2006.01) |
| *E04C 2/24* | (2006.01) |
| *E04C 2/288* | (2006.01) |
| *E04C 2/52* | (2006.01) |
| *E04F 13/14* | (2006.01) |
| *E04B 2/02* | (2006.01) |

(52) U.S. Cl.
CPC .............. *B32B 5/245* (2013.01); *B32B 13/02* (2013.01); *B32B 13/045* (2013.01); *E04B 1/7076* (2013.01); *E04B 1/74* (2013.01); *E04B 1/762* (2013.01); *E04B 1/7645* (2013.01); *E04B 2/02* (2013.01); *E04C 2/243* (2013.01); *E04C 2/288* (2013.01); *E04C 2/523* (2013.01); *E04F 13/007* (2013.01); *E04F 13/0866* (2013.01); *E04F 13/0875* (2013.01); *E04F 13/148* (2013.01); *B32B 2250/02* (2013.01); *B32B 2307/304* (2013.01); *B32B 2307/712* (2013.01); *B32B 2307/7265* (2013.01); *B32B 2307/73* (2013.01); *B32B 2419/04* (2013.01); *B32B 2607/00* (2013.01); *E04F 2203/04* (2013.01)

(58) Field of Classification Search
CPC ... E04F 13/0866; E04F 13/148; E04F 13/007; E04F 13/0875; E04F 2203/04; E04C 2/288; E04C 2/523; E04C 2/243; B32B 5/06; B32B 5/245; B32B 13/045; B32B 3/30; B32B 5/145; B32B 13/02; B32B 2307/304; B32B 2607/00; B32B 2250/02; B32B 2307/7265; B32B 2307/73; B32B 2307/712; B32B 2419/04

USPC ..................... 52/302.1, 309.4, 309.17, 588.1
See application file for complete search history.

(56) References Cited

U.S. PATENT DOCUMENTS

| | | | | |
|---|---|---|---|---|
| 3,204,929 | A * | 9/1965 | Bryant | F16K 27/105 251/329 |
| 3,222,697 | A * | 12/1965 | Scheermesser | A47C 27/144 297/452.48 |
| 4,279,548 | A * | 7/1981 | Ramey | E02D 17/086 37/189 |
| 5,369,926 | A * | 12/1994 | Borland | E04D 11/02 428/158 |
| 5,867,956 | A * | 2/1999 | Gregory, Jr. | E04D 13/172 428/167 |
| 7,785,052 | B2 * | 8/2010 | Kanczuzewski | B60P 7/0892 410/121 |
| 8,769,894 | B2 * | 7/2014 | Power | E04B 1/70 52/302.1 |
| 2002/0112653 | A1 * | 8/2002 | Moore, Jr. | B65D 19/0012 108/57.25 |
| 2005/0011841 | A1 * | 1/2005 | Huish | B25H 3/04 211/70.6 |
| 2009/0025312 | A1 * | 1/2009 | Deans | E04B 5/12 52/167.3 |
| 2010/0319288 | A1 * | 12/2010 | Morse | B32B 5/18 52/518 |
| 2012/0317923 | A1 * | 12/2012 | Herdt | B29C 44/1214 52/783.11 |
| 2012/0324814 | A1 * | 12/2012 | Amend | E04F 13/0875 52/302.1 |
| 2013/0247493 | A1 * | 9/2013 | Culpepper | E04F 13/075 52/309.4 |
| 2015/0047281 | A1 * | 2/2015 | Cole | E04F 13/148 52/302.1 |

* cited by examiner

PRE-FABRICATED CONSTRUCTION PANELS

This application is a 371 application of PCT/EP2014/06987, filed Sep. 8, 2014, the contents of which are incorporated by reference herein.

FIELD OF THE INVENTION

The present invention relates to pre-fabricated construction panels for use on an external surface and/or as part of a building or construction. The invention further relates to the use of such pre-fabricated construction panels.

BACKGROUND OF THE INVENTION

A pre-fabricated construction panel for use on an external surface and/or as part of a building or construction is disclosed in GB2479023B. The panel comprises a water repellant particulate board.

When fiber cement board is used, the fiber cement board shows at least two reasons for dilatation in the directions parallel to the fiber cement board.

When the fiber cement board is exposed to changing humidity, rain, etc, the fiber cement board will show a dilatation due to the changing humidity of the board itself. This is typically a reversible dilatation. Over time, carbonatation of the fiber cement board will cause a permanent dilatation as well.

During use of the pre-fabricated construction panel, the pre-fabricated construction panel may become curved or may crack due to internal tension implied by said dilatations.

SUMMARY OF THE INVENTION

It is an object of the present invention to provide pre-fabricated construction panels for use on an external surface and/or as part of a building or construction, which has improved properties during use.

According to a first aspect of the present invention, a pre-fabricated construction panel for use on an external surface and/or as part of a building or construction is provided. The panel comprises at least a first layer which is at least partially provided from thermally insulating material having a first surface, the panel comprising at least a second layer, the at least second layer being provided from fiber cement board, the second layer having a second surface facing the first surface. The first surface is profiled having recessed surface zones and heightened surface zones, the first and the second layers being connected one to the other at least along the heightened surface zones of the first layer, the recessed surface zones provides at least one interspace between the first and second surface. This at least one interspace has at least two openings to the external of the panel for enabling air to flow into and out of the interspace towards the external of the panel.

Less than 25% of the total surface area of the first surface is connected to, e.g. adheres to, the second surface.

The first and second layers may be connected one to the other along the heightened surface zones of the first layer, having no connection along the other zones, such as the recessed zones, of the first layer.

The first and second layer may be connected to each other by means of an adhesive.

The thermally insulating material means material having a thermal conductivity (lambda) less than or equal to 0.05 W/mK, more preferred in the range of 0.002 to 0.05 W/mK, more preferred in the range of 0.02 to 0.04 W/mK. This lambda is measured using the method ASTM C518

The first layer may completely be provided from thermally insulating material.

The interspace hence allows air to circulate from the outside of the plate, into the interspace, and back outwards to the exterior of the plate. When the pre-fabricated construction panel is placed at the outside of a construction or building, the external air can flow through the interspace. The humidity of the fiber cement plate at the surface of the second layer facing the first layer can equilibrate with the external air, just as the surface of the second layer facing the exterior does. As such less or no difference in humidity between the one and the other face of the fiber cement board is obtained, reducing the tendency to build up internal tensions or even bending of the fiber cement board. As such also the carbonatation of the fiber cement board at the surface of the fiber cement board facing the first layer can equilibrate with the side of the fiber cement board facing the exterior. Again less or no difference with regard to carbonatation between the two faces of the fiber cement board is noticed.

This interspace, when properly oriented during use, may allow infiltrating liquid to drain of out of the interspace.

The presence of the interspaces also prevents humidity to accumulate between the first layer partially or fully provided from thermally insulating material, and the second layer, e.g. in void spaces between the two layers in case which may exist in case the first and second layer are glued one to the other without the provision of such interspaces.

A further advantage is that the interspace works as a pressure equilibration system. Wind pressure exercised on the surface of the fiber cement side of the panel causes air to penetrate between the panels when mounted to cover walls. The pressure of the wind pushed between two plates is equilibrated by the presence of the interspaces, thereby avoiding rain to penetrate in the cavities to a large extent.

A further advantage is that the interspaces facilitate demolition at the life-end of the panel. The fiber cement plate can more easily be removed from the thermally insulating material, which on its turn facilitated the separate recycling of the two materials.

According to some embodiments of the present invention, the average distance (T) from the recessed surface zone of the first to the second layer along the at least one interspace may range from 2 mm to 35 mm.

More preferred this average distance, which can also be referred to as the average thickness T of the interspaces, may vary from 2.5 mm to 30 mm, such as mostly preferred between 3 mm and 25 mm, such as between 3 mm and 20 mm, e.g. between 3 mm and 15 mm, or even between 3 mm and 10 mm, e.g. 3 mm, 3.5 mm, 4 mm, 4.5 mm 5 mm and 5.5 mm.

According to some embodiments of the present invention, 1% to 25% of the total surface area of the first surface may be connected to, e.g. adheres to, the second surface.

The open space of the second surface hence is preferably between 75 and 99% of the total surface area of this second surface. The open space of the second surface of the second layer preferably is more than 75%, and most preferred more than 80%, expressed as % of the total surface area of the second surface of the at least second layer.

The total surface area of the projection of the first surface on the second surface is preferably about equal to the total surface area of the second surface.

More preferred the total surface of the projection of the interspaces on the second surface of the second layer is 96% to 99% of the total surface area of the second surface and as mostly preferred between 97% and 99%.

The profiled surface may be profiled in many ways. The profile may have a uniform cross section for a consecutive planar section according to a plane perpendicular to the plane of the first surface, consecutive in a direction parallel to the plane of the first surface. This cross section may e.g. be wave shaped according to a stepped wave, sinusoidal wave (optionally with crests cut away providing a planar top), or a repetitive triangular, trapezoid or oval recesses between heightened zones.

According to some embodiments of the present invention, the pre-fabricated construction panel may have a substantially rectangular shape having a first pair of substantially parallel sides and a second pair of substantially parallel sides, the length of the first pair of sides being smaller in comparison to the length of the second pair of sides, the heightened surface zones being strips oriented at an angle with the first side between 0° and 60°, inclusive.

The heightened surface zones adhering to the second surface by means of an adhesive, may be provided in substantially straight lines from one side of the shape to an other side, typically an opposite side of a rectangular shape. As such interspaces are provided which have openings at both sides of the shape of the pre-fabricated construction panel.

Preferably the openings are provided in the sides of the pre-fabricated construction panel which are to orient upwards and downwards when the panel is used and placed on an external surface and/or as part of a building or construction. In case of a rectangular shaped pre-fabricated construction panel, this is typically the long sides of the rectangular shape. Once the pre-fabricated construction panel is installed, the upwards oriented interspaces facilitate the creation of draft between the two layers of the pre-fabricated construction panel. When the orientation of the heightened surface zone strips is under an angle of substantially 0° with the short side of the rectangular shape, i.e. the first side, the interspaces make upwards running corridors. More preferred this angle is between 0° and 60°, and most preferred between 40° and 50° such as about 45°. The so formed diagonal corridors allow the panel to be cut into smaller pieces, still ensuring sufficient intermediate adhering to the first and second surface. This inclined orientation also allows the panel to be suitable for installation independently the orientation (horizontal or vertical) of the short side of the panel. According to some embodiments of the present invention, the pre-fabricated construction panel may have a substantially rectangular shape having a first pair of substantially parallel sides and a second pair of substantially parallel sides, the length of the first pair of sides being smaller in comparison to the length of the second pair of sides, the at least one interspace having an opening at both sides of both pair of substantially parallel sides.

The heightened surface zones adhering to the second surface by means of an adhesive may be provided as heightened discrete zones or "islands", preferably equally distributed over the whole surface of the first and second layer. As such an interspace is provided which have openings towards all sides of the shape of the pre-fabricated construction panel. The discrete zones may be identical or different one from the other, and may have any shape, such as rectangular, triangular, square, circular, oval or any other shape.

The heightened surface zones and the recessed surface zones in the profiled surface may be provided by any known method, such as cutting, milling, sawing and alike, or by shaping and/or profiling using hot wire techniques such as hot wire cutting, or by providing the profile during moulding or during extrusion and alike.

The at least the heightened surface zones may adhere to the second surface by means of an adhesive. The adhesive used can be any suitable adhesive, such as thermoplastic adhesive, however more preferred, suitable structural gluing is used. The adhesives typically are silicone-based or modified silicone polymers, e.g. silyl modified polymers (SMP) or modified silicone polymers (MS polymers). Alternatively an adhesive is used provided as a two-side adhesive tape.

Optionally, the sides of the interspaces between the heightened surface zones and the recessed surface zones may be provided with a rigid support, e.g. a metal or polymeric rigid bar, typically having a rectangular, triangular square radial cross section, optionally provided with adhesive at least along the contact zone of this rigid support with the first surface of the first layer.

According to some embodiments of the present invention, the sides of the interspaces between the heightened surface zones and the recessed surface zones may be provided with a rigid support. According to some embodiments of the present invention, the rigid support may be provided with adhesive at least along the contact zone of this rigid support with the first surface of the first layer. According to some embodiments of the present invention, the fiber cement board may be provided with water repellant properties.

The term "water repellant properties" means that the board has a water take up of less than 1.5 ml after 48 h using the RILEM Test No 11.4 in horizontal application. Preferably the water take up is even less than 1 ml per 48 h according to this test.

The fiber cement board can be provided with water repellant properties by the use of additives in the fiber cement slurry during the production of the fiber cement board. Such additives typically are silicone based additives.

The fiber cement board can be provided with water repellant properties by applying a hydrophobic coating to the side of the fiber cement board which faces away from the first layer. Such coating may be provided by using repellant surface hydrophobation coating, e.g. a water based silane/silicone emulsion, e.g. the DOW CORNING® 520 dilutable water repellent.

According to some embodiments of the present invention, the thermally insulating material may comprise is a rigid foam.

The thermally insulating material may be a layered material comprising at least one of expanded or extruded polystyrene, a phenol based foam, polyisocyanurate or polyurethane.

Alternatively or additionally, the thermally insulating material may be a layered material comprising two or more layers of expanded polystyrene (EPS), extruded polystyrene (XPS), polyisocyanurate (PIR) or polyurethane (PUR). Optionally the thermally insulating material may comprise, at one or both surfaces, a water impermeable sheet or layer of material, such as a sheet or layer of aluminum.

Typically the thickness of the layer provided from thermally insulating material is in the range of 3 to 10 cm, more preferably in the range of 4 to 8 cm such as in the range of 4 to 8 cm. This thickness is measures at the heightened surface zones of this layer.

According to some embodiments of the present invention, the fiber cement board may be an autoclave cured fiber cement board. According to some embodiments of the present invention, the fiber cement board may be an air cured fiber cement board.

The fiber cement board may be provided by a so-called Hatschek process, or by a flow-on process or by a Magnani process.

The fiber cement board typically is provided by a so-called Hatschek process, using fiber cement slurry to make the cement board. The fiber cement board typically is made using a slurry comprises water, process or reinforcing fibers which both may be natural organic fibers (typically cellulose fibers) or synthetic organic fibers (polyvynilalcohol, polyacrilonitrile, polypropylene, polyamide, polyester, polycarbonate, polyethylene, etc.), cement e.g. Portland cement, limestone, chalk, quick lime, slaked or hydrated lime, ground sand, silica sand flour, quartz flour, amorphous silica, condensed silica fume, microsilica, metalkaolin, wollastonite, mica, perlite, vermiculite, aluminum hydroxide, pigments, anti-foaming agents, flocculants, and other additives.

The "green" fiber cement board, after being made by e.g. the Hatschek-process, may be first pre-cured to the air, after which the pre cured board is further air cured until it has its final strength, or autoclave cured using pressure and steam, to give the board its final properties.

According to a second aspect of the present invention, a pre-fabricated construction panel according to the first aspect of the present invention is used to provide an external surface of a building or construction. The pre-fabricated construction panel according to the first aspect of the present invention may be provided in front of an external surface, e.g. an existing wall, of a building or construction. The first layer may be facing towards this external surface of the building or construction, the second layer may be facing away from this external surface of the building or construction.

Optionally, though not necessarily, a finishing layer can be provided once the panel is installed, such as a layer of paint or plaster. This finishing layer may be provided on the surface of the second layer, facing away from the first layer.

The independent and dependent claims set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

The same reference signs refer to the same, similar or analogous elements in the different figures.

DESCRIPTION OF ILLUSTRATIVE EMBODIMENTS

The present invention will be described with respect to particular embodiments. It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

Figure 1:
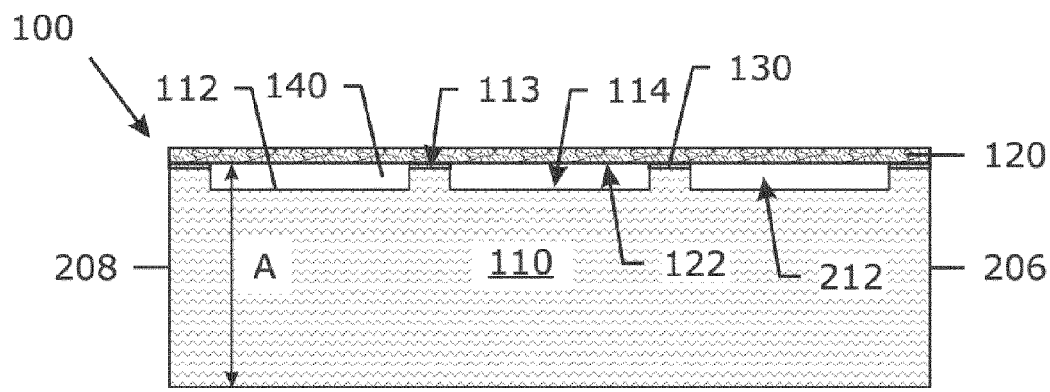
FIGS. 1 and 2 show schematically a side view and a top view of a pre-fabricated construction panel for use on an external surface and/or as part of a building or construction.
Figure 2:
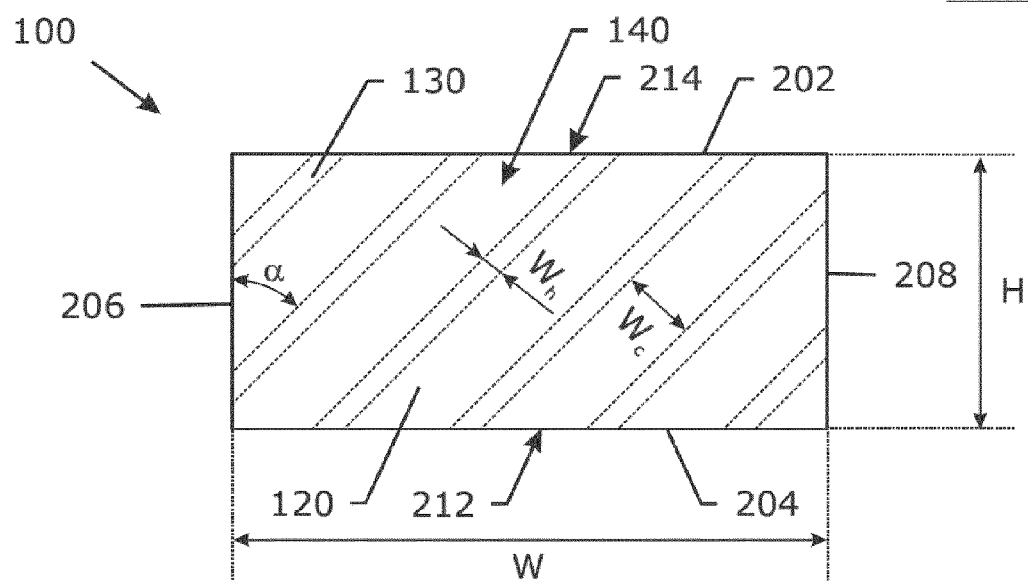

An example of a pre-fabricated construction panel 100 for use on an external surface and/or as part of a building or construction is shown in FIG. 1 and FIG. 2. The panel 100 comprises first layer 110 which is provided from thermally insulating material, in this embodiment a sheet of polyisocyanurate, at both sides covered with a water impermeable sheet of aluminum. The thermally insulating material has a profiled rectangular surface 112 with height H and width W substantially equal to the dimensions of the fiber cement board of the second layer 120. The first layer 110 has a profiled surface 112, having heightened surface zones 113 and recessed surface zones 114. The thickness A of the thermally insulating material is about 60 mm, however may be more. The thickness A is measures at the heightened surface zones 114.

The panel comprises a second layer 120 being fiber cement board.

The fiber cement board has a substantially rectangular surface with height 2.5 meter and width of 1.22 meter. The thickness of the fiber cement board is 8 mm. The fiber cement board is commercially available from Eternit NV as EQUITONE [Tectiva].

The fiber cement board is provided using the Hatschek process, after which the green fiber cement board is autoclave cured.

The fiber cement board is provided with water repellant properties by a water repellant surface hydrophobation. The surface is treated with a water based silane/silicone emulsion, e.g. the DOW CORNING® 520 dilutable water repellent. An alternative embodiment uses an air cured fiber cement product with height 2.5 m, a width of 1.25 m and thickness of 10 mm, which is available from Eternit NV as BLUCLAD plates. The air cured fiber cement product is provided with hydrophobic properties by treating the plate two-sided using a water repellent agent.

The heightened surface zones 113 of the first layer 110 and the surface 122 of the second layer 120 are connected one to the other by an adhesive 130. As such interspaces 200 are delimited starting at one of the long sides of the panel 202, and running towards the opposite long side 204 of the panel. The direction of the stripes make an angle α with the short side 206 and 208 of the panel of about 45°. The adhesive 130 adheres to the heightened surface zones 113 of the thermally insulating material and to one side 122 of the fiber cement board. As such, interspaces 140, or air channels, are provided which has openings 212 and 214 to the external of the plate. As such these interspace openings 212 and 214 enable air to flow into and out of the interspace 140 towards the external of the plate.

The adhesive used are polyurethane, silicone based or modified silicone based adhesives. An example of a suitable polyurethane based adhesive is Sikabond® T55 available from Sika. An example of silicone-based or modified silicone polymers is the Silyl modified polymer (SMP)-based adhesive PanelTack HM of Bostik BV.

The heightened surface zones 113 are provided as stripes with a width Wh of the stripes is about 5 to 6 mm. The axial distance from one heightened surface zone 113 to the other, in this embodiment being the width Wc of the air channels 140, is between 20 and 30 cm, preferably about 30 cm. As such, the heightened surface zone 113 adhere to about 1.5% of the surface area of the fiber cement board hence leaves open 98.5% of the fiber cement board surface.

Figure 3:
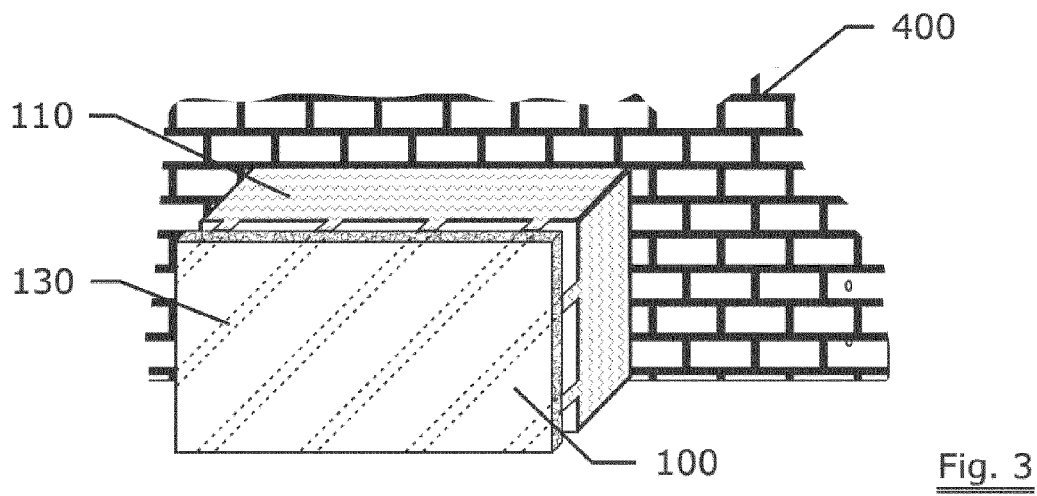
FIG. 3 shows schematically the panel of FIG. 1 when used to cover an external surface 400 of a building or construction.

As shown in FIG. 3, the pre-fabricated construction panel 100 is used to cover an external surface 400 of a building or construction. The interspaces 140 create air circulating upwards or downwards between the two layers of the panel 100, while being inclined in view of the vertical under 45°.

Figure 4:
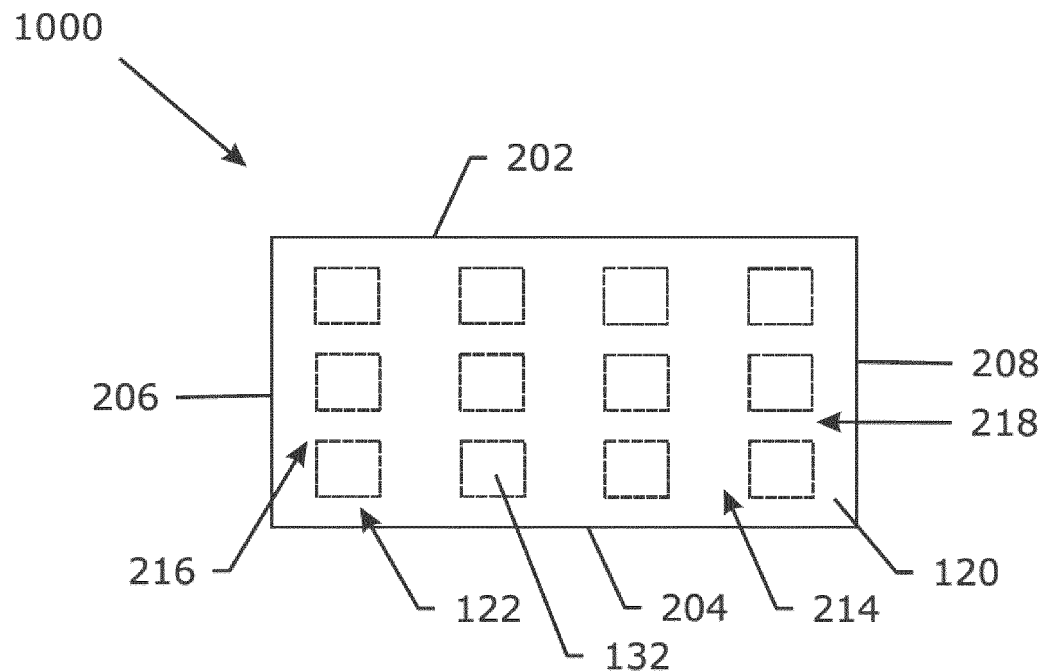
FIG. 4 shows schematically a top view of an other pre-fabricated construction panel for use on an external surface and/or as part of a building or construction.

In an alternative embodiment of a pre-fabricated construction panel 1000 in top view shown in FIG. 4, the heightened surface zones 132 are is not provided as stripes as shown in FIG. 1, but as discrete islands 132. As such one interspace 140 is provided, having openings 212, 214, 216 and 218 at all sides 202, 204, 206 and 208 of the panel 1000.

Figure 5:
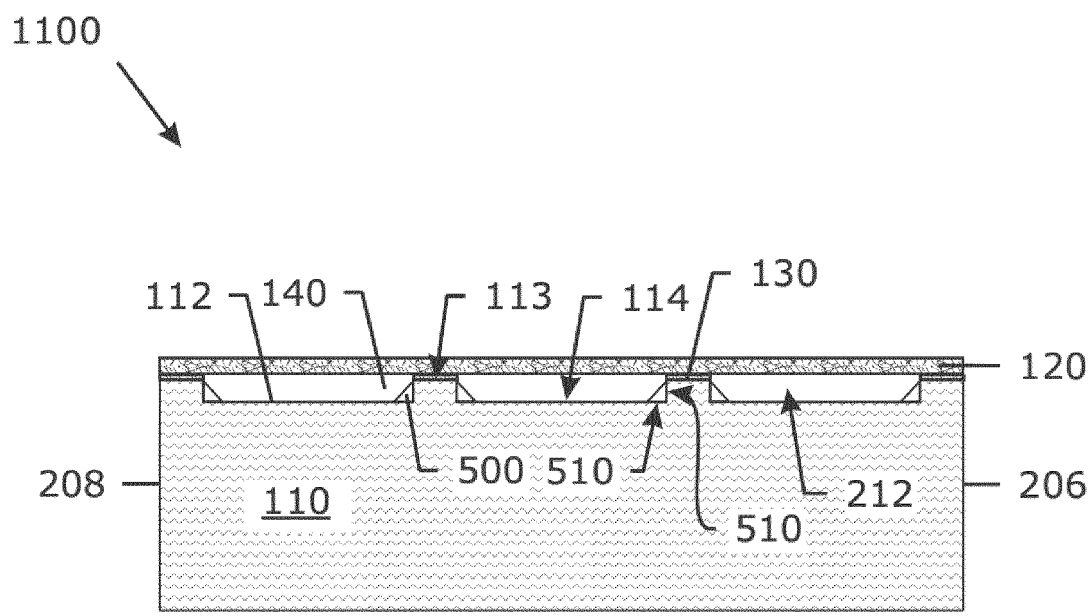
FIG. 5 shows schematically a side view of an other pre-fabricated construction panel for use on an external surface and/or as part of a building or construction.

An alternative embodiment of a pre-fabricated construction panel 1100 in side view shown in FIG. 5. The interspaces 140 between the heightened surface zones 113 and the recessed surface zones 114 are reinforced with a rigid support 500, e.g. a polymeric rigid, triangularly shapes bar. The bars are provided with adhesive 510 at least along the contact zone of this rigid support 500 with the first surface 112 of the first layer 110.

All other dimensions and thicknesses can be held similar to the embodiment in FIG. 1.

It is to be understood that although preferred embodiments and/or materials have been discussed for providing embodiments according to the present invention, various modifications or changes may be made without departing from the scope and spirit of this invention.

The invention claimed is:

1. A pre-fabricated construction panel for use on an external surface or as part of a building or construction, said panel comprising
    at least a first layer (110) which is at least partially provided from thermally insulating material and having a first surface (112),
    at least a second layer (120) provided from fiber cement board and having a second surface (122) facing said first surface (112),
    said first surface (112) being profiled and having recessed surface zones (114) and heightened surface zones (113), said first and said second layers (110, 120) being connected one to the other at least along the heightened surface zones (113) of said first surface (112),
    said recessed surface zones (114) providing at least one interspace (140) between said first and second surfaces (112, 122),
    said at least one interspace (140) having at least two openings to the external of said panel (100) for enabling air to flow into and out of the interspace (140) towards the external of said panel (100), wherein
    less than 25% of the total surface area of said first surface (112) is connected to said second surface (122), with said panel (100) configured to facilitate circulation of air between said first and second layers (110, 120) and maintain equilibration of humidity and carbonation on opposite surfaces surrounding the second layer (120),
    the sides of the interspaces (140) between the heightened surface zones (113) and the recessed surface zones (114) are provided with a rigid support (500) extending along the first surface (112) of the recessed surface zones (114) and parallel to the heightened surface zones (113) of said panel (100),
    said rigid support (500) is a bar formed from polymeric material and having a triangular cross-section and contacts both the first surface (112) and a perpendicular edge of the adjacent heightened surface zone (113),
    the pre-fabricated construction panel (100) has a substantially rectangular shape having a first pair of substantially parallel sides (206, 208) and a second pair of substantially parallel sides (202, 204),
    the length of said first pair of sides (206, 208) being smaller in comparison to the length of said second pair of sides (202, 204), and
    the heightened surface zones (113) consist of parallel strips all oriented at the same angle with the first side between 0° and 60°, inclusive.

2. A pre-fabricated construction panel according to claim 1, wherein the average distance (T) from the recessed surface zone of the first to the second layer along the at least one interspace ranges from 2 mm to 35 mm.

3. A pre-fabricated construction panel according to claim 1, wherein 1% to 25% of the total surface area of said first surface is connected to the second surface.

4. A pre-fabricated construction panel according to claim 1, wherein said rigid support (500) is provided with separate adhesive at least along the contact zone of said rigid support (500) with the first surface (112) of the first layer (110).

5. A pre-fabricated construction panel according to claim 1, wherein the fiber cement board is provided with water repellant properties.

6. A pre-fabricated construction panel according to claim 1, wherein the thermally insulating material (110) comprises a rigid foam.

7. A pre-fabricated construction panel according to claim 1, wherein the fiber cement board is an autoclave cured fiber cement board.

8. A pre-fabricated construction panel according to claim 1, wherein the fiber cement board is an air cured fiber cement board.

9. A method of covering an external surface of a building or construction, said method comprising: installing a pre-fabricated construction panel according to claim 1, wherein the first layer faces towards the external surface of the building or construction, and wherein the second layer faces away from the external surface of the building or construction.

10. The method of claim 9 wherein a finishing layer is provided on the surface of the second layer, facing away from the first layer.

11. The method of claim 10 wherein the finishing layer is a layer of paint or plaster.

12. A pre-fabricated construction panel according to claim 1, wherein said rigid support bar (500) contacts the perpendicular edge of the adjacent heightened surface zone (113) on each side of said heightened surface zones (113) within said respective interspaces (140).

* * * * *